United States Patent [19]

Norton-Wayne

[11] 4,360,274
[45] Nov. 23, 1982

[54] WORKPIECE IDENTIFICATION APPARATUS

[75] Inventor: Leonard Norton-Wayne, London, England

[73] Assignee: USM Corporation, Farmington, Conn.

[21] Appl. No.: 222,180

[22] Filed: Jan. 2, 1981

[30] Foreign Application Priority Data

Jan. 9, 1980 [GB] United Kingdom ............... 8000663

[51] Int. Cl.$^3$ ............................................. G01B 11/00
[52] U.S. Cl. ............................. 356/394; 235/92 DN;
235/92 CA; 356/376; 356/398; 250/559;
250/223 R; 364/556
[58] Field of Search ....................... 209/598, 586–588;
356/394, 376, 379, 380, 383–385, 398; 235/92
DN, 92 CA; 250/559, 560, 223 R; 364/478,
556, 562, 564

[56] References Cited

U.S. PATENT DOCUMENTS

| 3,395,794 | 8/1968 | Petry ................................. 209/586 |
| 3,521,749 | 7/1970 | Dijstelbergen et al. ......... 209/598 X |
| 3,525,433 | 8/1970 | Babb ............................... 209/586 X |
| 3,902,811 | 9/1975 | Altman et al. .................. 356/394 X |
| 4,055,834 | 10/1977 | Planke ............................ 356/398 X |
| 4,105,925 | 8/1978 | Rossol et al. ................... 356/379 X |
| 4,259,571 | 3/1981 | Dubberly .................. 235/92 DN X |
| 4,298,285 | 11/1981 | Ito .................................... 356/376 |
| 4,325,640 | 4/1982 | Dreyfus et al. ..................... 356/376 |

OTHER PUBLICATIONS

"Control Devices and Systems," *Control Engineering*, vol. 20, Jun. 1973.

*Primary Examiner*—Allen N. Knowles
*Attorney, Agent, or Firm*—William F. White

[57] ABSTRACT

Workpiece identification apparatus for use in identifying to which of a number of predetermined types a workpiece belongs. The apparatus scans workpieces to be learnt and calculates a set of parameters of each workpiece. After scanning all the workpieces to be learnt, the apparatus selects a sub-set of the parameters such that the sub-set is unique for each learnt workpiece with an allowance for a selected number of parameters to be erroneously determined. The apparatus then scans workpieces to be identified and calculates an equivalent sub-set of parameters thereof and identifies the workpiece by comparing this sub-set with the learnt sub-sets.

13 Claims, 2 Drawing Figures

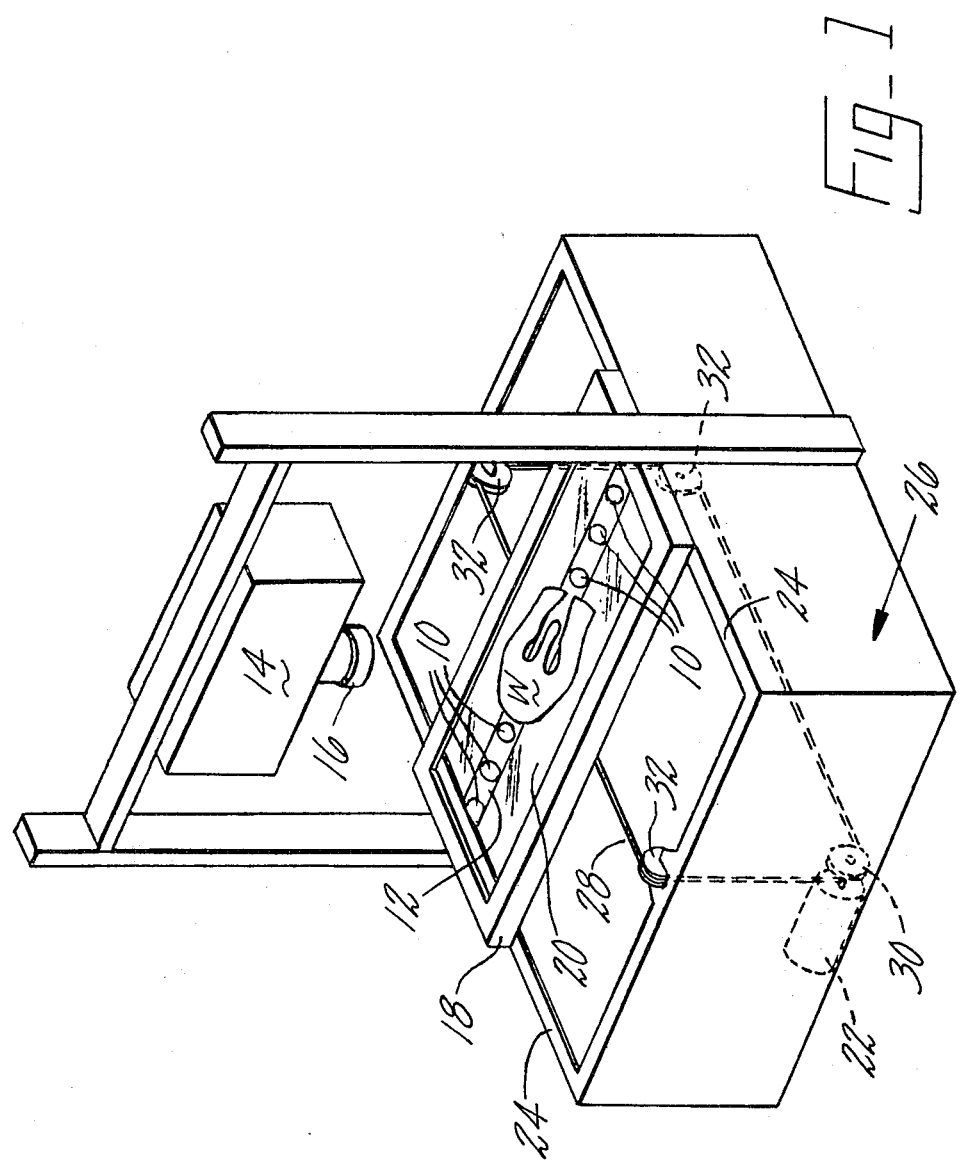

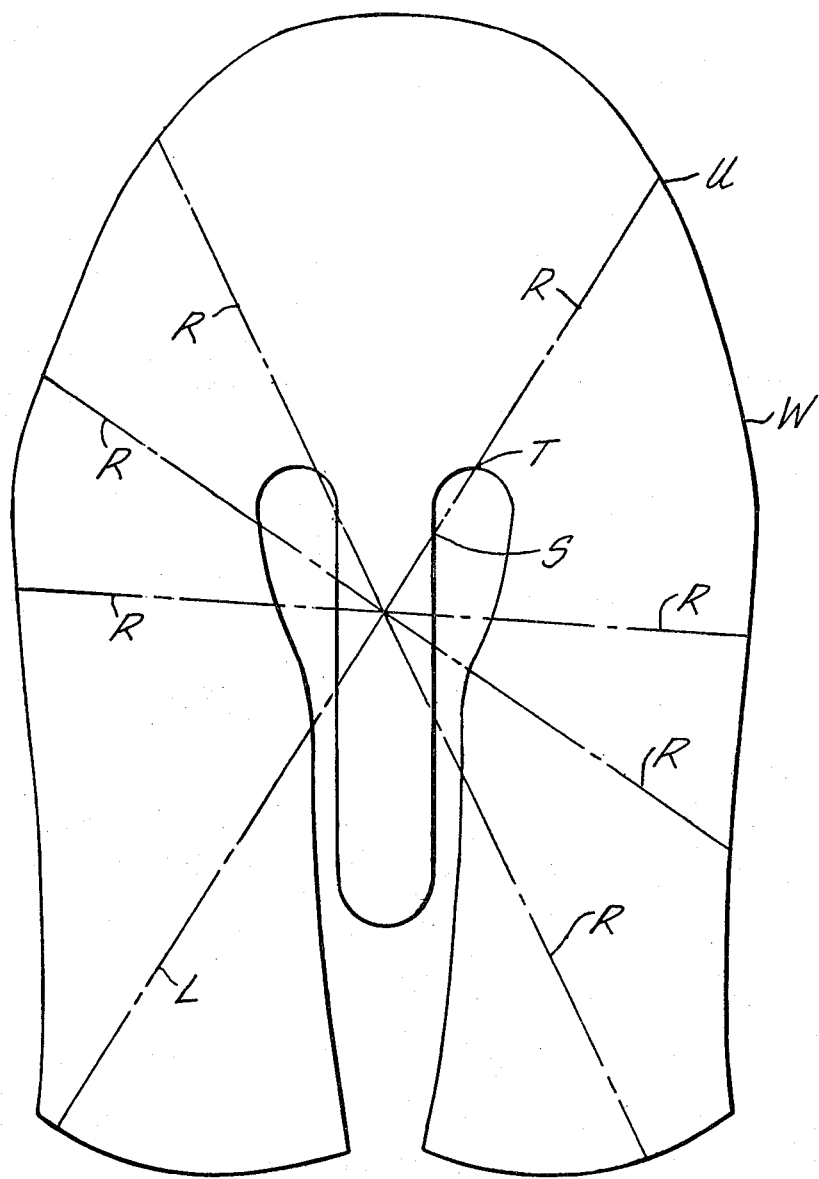
FIG_2

WORKPIECE IDENTIFICATION APPARATUS

FIELD OF THE INVENTION

This invention is concerned with workpiece identification apparatus particularly for use in identifying to which of a number of predetermined types a workpiece belongs.

BACKGROUND OF THE INVENTION

In various industries, it is desirable if workpieces arriving at a locality can be automatically sorted by type either for packaging together with other workpieces of the same type or for operations to be performed on the workpieces. Apparatus for carrying out this automatic sorting must perform rapidly to enable a high production rate to be achieved and without misidentifying workpieces.

SUMMARY OF THE INVENTION

Apparatuses for performing automatic sorting generally "look at" the silhouette of the workpiece when the workpiece is placed either between a light source and light detectors of the apparatus or in a position to reflect light to the detectors and criteria are established for identifying the workpiece by how many or which of the detectors detect the workpiece. Such apparatuses can identify workpieces so long as the differences between the workpieces are sufficiently large but cannot distinguish between closely similar types because the arrangements that such apparatus comprises for eliminating detection errors are inadequate. For example, such apparatus is incapable of distinguishing between shoe upper components of adjacent size or between such components for left and right shoes. Shoe upper components generally differ by approximately 2% in length or width between adjacent sizes and 4% in area.

OBJECTS OF THE INVENTION

It is an object of the present invention to provide an apparatus for use in identifying to which of a number of predetermined types a workpiece belongs, the apparatus being capable of distinguishing between closely similar workpieces.

The invention provides apparatus for use in identifying to which of a number of predetermined types a workpiece belongs, the apparatus being operable in a learning mode in which it it presented with a workpiece of each of the predetermined types in order to learn those workpieces or in an identifying mode in which it identifies workpieces presented thereto by comparison with the learnt workpieces, the apparatus comprising a light source, an array of light detectors each operable to detect whether a workpiece is present on the optical path between the light source and the detector, moving means operable to cause relative movement such that a workpiece moves across the optical paths between the light source and the detectors, recording means operable to record after each unit distance of movement caused by the moving means which of the detectors detects a workpiece, calculating means operable, when the apparatus is in the learning mode, to calculate, from the data recorded by the recording means, a predetermined set of parameters of the workpiece, selecting means operable, when the apparatus is in the learning mode and after the calculating means has calculated a set of parameters for all the workpieces to be learnt, to select a sub-set of the parameters such that the sub-set formed by those parameters for each learnt workpiece differs from every other such learnt sub-set in at least a number of respects equal to twice a preselected acceptable error plus one, where the preselected acceptable error is a number selected as the number of the parameters which it is acceptable to erroneously determine, the calculating means being operable in the identifying mode to calculate the parameters of the workpiece which form an equivalent sub-set to the learnt sub-sets, and comparing means operable in the identifying mode to compare the equivalent sub-set with the learnt sub-sets and in the event of finding identity with the sub-set of a workpiece of a particular type except for a number of differences not greater than the acceptable error to identify the workpiece as being of that particular type.

BRIEF DESCRIPTION OF THE DRAWINGS

An apparatus which is illustrative of the invention is hereinafter described with reference to the accompanying drawings. The illustrative apparatus has been selected for description by way of example but not of limitation.

In the drawings:

FIG. 1 is a diagrammatic perspective view of a portion of the illustrative apparatus; and FIG. 2 is a plan view of a workpiece showing various parameters marked thereon.

DESCRIPTION OF THE PREFERRED EMBODIMENT

The illustrative apparatus is for use in identifying to which of a number of predetermined types a workpiece belongs. The workpieces for which the illustrative apparatus is specifically designed are shoe upper components in the form of shaped pieces in sheet-form of leather or synthetic material. However, it will be understood that the illustrative apparatus can operate on other types of sheet-form workpiece or on three-dimensional objects by scanning their silhouettes. The apparatus is operable in a learning mode in which it is presented with a workpiece of each of the predetermined types in order to learn those types. In the case of shoe upper components, the apparatus is presented with a component of each size and kind that is to be encountered and, where appropriate, with a left and a right example of each component. It may not be necessary to present the apparatus with actual workpieces in the learning mode but representatives of the same size and shape as the workpiece made, for example, of cardboard may be used. Furthermore, the apparatus may learn a left and a right component by being presented with a component and then with the same component but upsidedown. The illustrative apparatus is also operable in an identifying mode in which it identifies workpieces presented thereto by comparison with the learnt workpieces.

The illustrative apparatus comprises a light source in the form of a line of filament lamp 10 (FIG. 1) supported on a bar 12. It is to be understood that, although the terms "light source" and "light detectors" are used in this specification other suitable radiation may be substituted for light if desired. The apparatus also comprises an array of light detectors 14 arranged to receive light emitted by the lamps 10 and focused on to the detectors by a high resolution lens 16. The array 14 comprises 770 photo-detectors arranged in a straight line with a centre to centre spacing of 0.3 millimeters.

Each of the detectors is operable to detect whether a workpiece is interrupting the optical path between the light source and the detector. The detectors are CCD sensors having sensitive areas of 17×13 microns.

The illustrative apparatus also comprises a table 18 on which is positioned a transparent cover 20 which is positioned above the lamps 10 and beneath the array 14. The arrangement is such that light leaving the lamps 10 passes through the cover 20 to the lens 16 and is then focussed on to the detectors except when the light is intercepted by a workpiece W on the cover 20. The optical path of the light thus extends from the lamps 10 to the cover 20 and thence to the detector. Although the illustrative apparatus is described as operating with the light from the lamps 10 being interrupted by the workpiece and the detectors detecting an absence of light, in a modification of the illustrative apparatus, the cover 20 is opaque and non-reflective and the lamps 10 are arranged to reflect light off the workpiece to the detectors which are arranged to detect light. In either case, the detectors detect whether a workpiece is present on the optical path between the lamps 10 and the detectors.

The illustrative apparatus also comprises moving means operable to cause relative movement such that a workpiece positioned on the cover 20 moves across the optical paths between the lamps 10 and the detectors. The moving means comprises a stepping motor 22 operable to move the table 18, and hence the cover 20 and the workpiece, stepwise along two rails 24 of a framework 26 located beneath the detectors. The motor 22 operates to move a cable 28 which passes around a pulley 30 fixed on the drive shaft of the motor 22 and three idler pulleys 32 mounted on the framework 26, and is connected to the front and rear of the table 18. The motor 22 moves the table from a position in which the workpiece on the cover 20 does not interrupt the optical paths to a position in which the entire workpiece has passed through the optical paths. Thus, the entire workpiece is "scanned." In a modification of the illustrative apparatus, the table 18 and the cover 20 may be replaced by a transparent conveyor belt driven by the stepping motor 22.

The illustrative apparatus also comprises data processing means (not shown) which comprises a computer but may alternatively comprise a combination of a microprocessor and other electrical circuitry. The computer is a PDP 11. The data processing means comprises recording means, calculating means, selecting means, and comparing means, the operation of all of which are explained below.

The recording means of the illustrative apparatus is operable to record after each unit distance of movement caused by the motor 22 which of the detectors detects a workpiece, the unit distance being the distance of one step of the stepping motor 22. A suitable stepping distance may be 300 microns. Thus, after each step of the stepping motor 22, the recording means records which of the 770 detectors is detecting a workpiece. In most cases, as the workpiece is moved beneath the detectors, groups of detectors at either end of the array 14 will not detect a workpiece while a central group of the detectors will detect the workpiece and it is convenient to record the information in the form merely of the numbers of the detectors at the extreme ends of the central group; this cuts down the amount of information stored by the recording means, since it is known that all the detectors between the recorded numbers are detecting the workpiece. If the workpiece outline contains hollows or if the workpiece has holes therethrough, there may be more than one group of detectors which detect the workpiece; in this case, the numbers of the detectors at the extreme ends of each group are recorded. The recording means records information for each step of the motor 22 so that the entire workpiece is "scanned."

The calculating means of the illustrative apparatus is operable, when the apparatus is in its learning mode, to calculate, from the data recorded by the recording means, a predetermined set of parameters of the workpiece. These parameters are the area of the workpiece, its longest radius measured from its centroid, and a plurality of radii at preselected angles to the longest radius. FIG. 2 shows a workpiece W having a centroid C, a longest radius L and radii R at angles of 60°, 90°, 120°, 180°, 240°, 270° and 300° to the longest radius L. However, any suitable angles may be used but the number of radii required is dependent on how many predetermined types of workpiece there are and how closely similar the workpieces are. The calculating means calculates the area by simply totalling the number of detectors which detect the workpiece for all the steps made by the motor 22 while the workpiece W was being scanned. The position of the centroid C and the radii L and R are simply calculated by well-known mathematical methods. It should, however, be noted that the lengths of the radii are calcualted from the co-ordinates of the furthest boundary point of the workpiece from the centroid C in the selected direction with any boundary points along the radius which are not the furthest from the centroid being ignored. Thus, considering the radius R at 180° to the longest radius L of the workpiece W shown in FIG. 2, the radius has the boundary points S, T and U along it but the points S and T are ignored as not being as far from the centroid as U. The number and angles of the radii calculated are selected to give a number of parameters sufficient for unambiguous identification.

However, in case it is found that further or different radii are required, as may occur if the number of predetermined types is later increased, the illustrative apparatus also comprises storage means operable to store the positions of all the boundary points of a learnt workpiece as recorded by the recording means. The information stored in the storage means is then available to the calculating means to allow it to calculate any radii of the workpiece W that may be desired. Thus, once a workpiece has been scanned it need never be rescanned even if the radii selected are changed.

After calculating the predetermined set of parameters, the calculating means makes the first of two error elimination steps made by the illustrative apparatus (the other error elimination step is described hereinafter). The first error elimination step comprises dividing the calculated parameters by a preselected number referred to hereinafter as the "tolerance" which is related to the accuracy with which the apparatus can measure. Division by the tolerance gives the parameters in terms of "tolerance cells" and the value of the parameter is regarded as the nearest whole number of tolerance cells. This procedure removes errors caused by slight inaccuracies such as may be caused by detectors whose optical paths are only partially interrupted, as may occur at boundaries of the workpiece, and which may or may not detect the workpiece. Also errors caused by slight variations in nominally identical workpieces are eliminated. The size of the tolerance in the illustrative apparatus is arranged to be different for the area and for the radii, although the radii may have the same tolerance or different tolerances applied to them. The area has a different tolerance because the area is a different kind of parameter to the radii, being a measure in square units as opposed to a length. The actual sizes of the area and radius tolerance are selected with regard to the types of workpiece, the spacing of the detectors, and the unit distance of the moving means. In the illustrative apparatus, the radius tolerance may be approximately equal to three of the separation distances of the detectors (i.e. approximately 0.9 millimeters) and the area tolerance may be approximately equal to five hundred times the separation distance of the detectors multiplied by the unit distance of the motor 22 (i.e. $500 \times 0.3 \times 0.3 = 45$ square millimeters).

The selecting means of the illustrative apparatus is operable, when the apparatus is in the learning mode and after the calculating means has calculated a set a parameters for all the workpieces to be learnt, i.e. a workpiece of each of the predetermined types. It will be appreciated that the same parameters are calculated for each workpiece to be learnt. The selecting means is operable to select a sub-set of the parameters such that the sub-set formed by those parameters for each learnt workpiece differs from every other such learnt sub-set in at least a number of respects equal to twice a preselected error plus one, where the preselected acceptable error is a number selected as the number of the parameters which it is acceptable to erroneously determine; this operation of the selecting means is the second error elimination step referred to above. If, for example, it is accepted that one parameter may be erroneously determined, the acceptable error is one and the selecting means must find sub-sets which differ from each other in at least three respects. Thus, if for example the area and eight radii (including the longest radius) as shown in FIG. 2 have been calculated, the selecting means may find that the condition of at least three differences can be achieved using only the area and the first six of these radii in which case the last two radii are discarded as unnecessary and are not included in the sub-set. If the acceptable error is selected as 2 or 3, the number of differences required will be 5 or 7 respectively. If the required number of differences cannot be achieved from the calculated parameters, it is necessary to calculate further radii for all the learnt workpieces utilizing the boundary points stored by the storage means. It should be noted that the selecting means of the illustrative apparatus always includes the area of the workpiece in the selected sub-set since this is the parameter that is most accurately determinable since it depends on information from a very large number of detectors whereas the radii depend on information from a relatively small number of detectors.

Once the selecting means has selected the sub-set of parameters, the illustrative apparatus can pass to the identifying mode. In the identifying mode, a workpiece to be identified is placed on the table and the moving means, the detectors, the recording means, and the calculating means operate in the same way as in the learning mode except that the calculating means is operable to calculate the parameters of the workpiece which form an equivalent sub-set to the learnt sub-sets.

After the calculating means has operated in the identifying mode, the comparing means of the illustrative apparatus operates. The comparing means is operable to compare the equivalent sub-set of the workpiece with the learnt sub-sets and in the event of finding identity with the sub-set of a workpiece of a particular type, except for a number of differences not greater than the acceptable error, to identify the workpiece as being of that particular type. With an acceptable error of one, the comparing means will "look" for a sub-set among the learnt sub-sets with at most one difference from the sub-set of the workpiece being identified. The allowance of one difference allows for one parameter to be erroneously determined which may occur if the workpiece has an anomaly in the direction of a radius used in the sub-set, such as an edge running along the radius. The size of any difference is immaterial and so gross errors can be eliminated.

In the identifying mode, the calculating means is also operative to calculate the orientation of the longest radius of the workpiece relative to the direction of movement caused by the motor 22. Thus, with the workpiece identified and its orientation on the cover 20 known, the workpiece can be removed from the cover 20 by a pick-and-place mechanism and accurately positioned either relative to other workpieces or in apparatus for carrying out operations on the workpiece.

It is found that the illustrative apparatus using 10 radii and an acceptable error of 3 is capable of identifying workpieces in the form of shoe upper components which only differ from each other by half a shoe size with a failure rate of only 1 in 1000 and can identify between left and right components.

I claim:

1. Apparatus for use in identifying to which of a number of predetermined types a workpiece belongs, the apparatus being operable in a learning mode in which it is presented with a workpiece of each of the predetermined types in order to learn those workpieces or in an identifying mode in which it identifies workpieces presented thereto by comparison with the learnt workpiece, the apparatus comprising a light source, an array of light detectors each operable to detect whether a workpiece is present on the optical path between the light source and the detector, moving means operable to cause relative movement such that a workpiece moves across the optical paths between the light source and the detectors, recording means operable to record after each unit distance of movement caused by the moving means which of the detectors detects a workpiece, calculating means operable, when the apparatus is in the learning mode, to calculate, from the data recorded by the recording means, a predetermined set of parameters of the workpiece, selecting means operable, when the apparatus is in the learning mode and after the calculating means has calculated a set of parameters for all the workpieces to be learnt, to select a sub-set of the parameters such that the sub-set formed by those parameters for each learnt workpiece differs from every other such learned sub-set in at least a number of respects equal to twice a preselected acceptable error plus one, where the preselected acceptable error is a number selected as the number of the parameters which it is acceptable to erroneously determine, the calculating means being operable in the identifying mode to calculate the parameters of the workpiece which form an equivalent sub-set to the learnt sub-sets, and comparing means operable in the identifying mode to compare the equivalent sub-set with the learnt sub-sets and in the event of finding identity with the sub-set of a workpiece of a particular type except for a number of differences not greater than the acceptable error to identify the workpiece as being of that particular type.

2. Apparatus according to claim 1 wherein the array of detectors is a straight row of detectors of even spacing.

3. Apparatus according to either one of claim 1 or 2 wherein the moving means is operable to move the workpiece stepwise with a step length equal to the unit distance.

4. Apparatus according to any one of claims 1 or 2, wherein the parameters calculated by the calculating means are the are a of the workpiece, its longest radius measured from its centroid, and a plurality of radii at preselected angles to the longest radius.

5. Apparatus according to claim 3 wherein the parameters calculated by the calculating means are the area of the workpiece, its longest radius measured from its centroid, and a plurality of radii at preselected angles to the longest radius.

6. Apparatus according to claim 5 wherein the selecting means always includes the area of the workpiece in the selected sub-sets.

7. Apparatus according to any one of claims 1 or 2 wherein the calculating means calculates the parameters in terms of tolerance cells by dividing each quantity measured by a preselected tolerance.

8. Apparatus according to claim 4 wherein the area is divided by an area tolerance and all the radii are divided by the same or different radius tolerances.

9. Apparatus according to claim 8 wherein the area is divided by an area tolerance and all the radii are divided by the same or different radius tolerances.

10. Apparatus according to claim 9 wherein the radius tolerance is the same for all the radii and is approximately equal to three of the separation distances of the detectors in the array.

11. Apparatus according to claim 9 wherein the area tolerance is approximately equal to five hundred times the separation distance of the detectors in the array mutiplied by the unit distance of the moving means.

12. Apparatus according to either claims 1 or 2 wherein the calculating means is also operative to calculate the orientation of the longest radius relative to the direction of movement of the moving means.

13. Apparatus according to either of claims 1 or 2 also comprising storage means operable to store the positions of all the boundary points of the learnt workpieces.

* * * * *

UNITED STATES PATENT OFFICE
CERTIFICATE OF CORRECTION

Patent No. 4,360,274　　　　　　　　Dated November 23, 1982

Inventor(s) Leonard Norton-Wayne

It is certified that error appears in the above-identified patent and that said Letters Patent are hereby corrected as shown below:

Claim 4 - Column 7, line 12 - after "the", first occurrence, cancel the words "are a" and insert "area"

Signed and Sealed this

Fifteenth Day of March 1983

[SEAL]

Attest:

Attesting Officer

GERALD J. MOSSINGHOFF

Commissioner of Patents and Trademarks